United States Patent
Choi

(10) Patent No.: US 9,954,452 B2
(45) Date of Patent: Apr. 24, 2018

(54) LOW VOLTAGE DIRECT CURRENT (DC)-DC CONVERTER

(71) Applicant: HYUNDAI MOBIS Co., Ltd., Yongin-si, Gyeonggi-do (KR)

(72) Inventor: Moon Gyu Choi, Suwon-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 15/334,026

(22) Filed: Oct. 25, 2016

(65) Prior Publication Data

US 2017/0170740 A1 Jun. 15, 2017

(30) Foreign Application Priority Data

Dec. 14, 2015 (KR) .................. 10-2015-0177843

(51) Int. Cl.
*H02M 3/335* (2006.01)
*H02M 3/337* (2006.01)
*H02M 1/00* (2006.01)
*H02M 1/34* (2007.01)

(52) U.S. Cl.
CPC ....... *H02M 3/33546* (2013.01); *H02M 3/337* (2013.01); *H02M 2001/0058* (2013.01); *H02M 2001/342* (2013.01); *Y02B 70/1491* (2013.01)

(58) Field of Classification Search
CPC ... H02M 2001/0058; H02M 2001/342; H02M 3/33569; H02M 3/33546
See application file for complete search history.

(56) References Cited

U.S. PATENT DOCUMENTS

| | | | |
|---|---|---|---|
| 2007/0025125 A1* | 2/2007 | Nakahori | H02M 1/32 363/56.02 |
| 2008/0170418 A1 | 7/2008 | Nishiyama et al. | |
| 2009/0129123 A1* | 5/2009 | Taurand | H02M 3/33576 363/17 |
| 2013/0223103 A1* | 8/2013 | Pahlevaninezhad | H02M 3/337 363/17 |

FOREIGN PATENT DOCUMENTS

KR  10-2008-0026125 A   3/2008

* cited by examiner

*Primary Examiner* — Harry Behm
(74) *Attorney, Agent, or Firm* — Knobbe Martens Olson & Bear LLP

(57) ABSTRACT

Disclosed herein is a low voltage direct-current (DC)-DC converter. The low voltage DC-DC converter includes a switching portion which includes a first switching portion and a second switching portion and changes a high voltage provided from a high voltage battery to an alternating current (AC) voltage, a transformer which converts the AC voltage output from the switching portion into a low voltage, and a switching portion zero voltage switching auxiliary circuit portion which is connected between the high voltage battery and the switching portion and operates when operations of the first and second switching portions change to consume residual energy in the switching portion.

8 Claims, 3 Drawing Sheets

LOW VOLTAGE DIRECT CURRENT (DC)-DC CONVERTER

CROSS-REFERENCE TO RELATED APPLICATION

This application claims priority to and the benefit of Korean Patent Application No. 10-2015-0177843, filed on 14 Dec. 2015, the disclosure of which is incorporated herein by reference in its entirety.

BACKGROUND

1. Field

The present disclosure relates to a low voltage direct current (DC)-DC converter, and more particularly, to a low voltage DC-DC converter configured to perform stable zero voltage switching using a zero voltage switching auxiliary circuit.

2. Discussion of Related Art

Generally, hybrid vehicles include a main battery with high voltage which is a fuel battery and an auxiliary battery with low voltage for supplying voltages to loads of electronic devices.

Also, a low voltage direct current (DC)-DC converter (LDC) capable of bidirectionally converting a voltage to decrease a voltage output from the main battery or to increase a voltage output from the auxiliary battery is provided between the main battery and the auxiliary battery.

SUMMARY

One aspect of the present invention is to provide a low voltage DC-DC converter configured to perform stable zero voltage switching using a zero voltage switching auxiliary circuit.

According to an aspect of the present invention, there is provided a low voltage direct current (DC)-DC converter, which converts a high voltage provided from a high voltage battery into a low voltage and supplies the low voltage to a low voltage battery, including a switching portion which includes a first switching portion and a second switching portion and changes the high voltage provided from the high voltage battery to an alternating current (AC) voltage, a transformer which converts the AC voltage output from the switching portion into a low voltage, and a zero voltage switching auxiliary circuit portion which is connected between the high voltage battery and the switching portion and operates at a time when operations of the first and second switching portions change to consume residual energy in the switching portion.

The zero voltage switching auxiliary circuit portion may operate at a time when the first switching portion changes from an on state to an off state and the second switching portion changes from an off state to an on state.

The zero voltage switching auxiliary circuit portion may operate at a time when the second switching portion changes from an on state to an off state and the first switching portion changes from an off state to an on state.

The zero voltage switching auxiliary circuit portion may include a first circuit portion which includes an auxiliary capacitor, a first diode, and a first auxiliary inductor mutually connected in series and connected to the high voltage battery in parallel, an auxiliary switch which has one end connected between the auxiliary capacitor and a anode of the first diode and operates by receiving, a switching signal transmitted from a phase shift control portion, and a second circuit portion which includes a second auxiliary inductor and a second diode mutually connected in series and connected between the other end of the auxiliary switch and an anode of the high voltage battery.

The anode of the first diode may be connected to a cathode of the high voltage battery through the auxiliary capacitor, and an anode of the second diode may be connected to the anode of the high voltage battery through the first auxiliary inductor.

A cathode of the second diode may be connected to the other end of the auxiliary switch, and an anode of the second diode may be connected to the anode of the high voltage battery through the second auxiliary inductor.

When the auxiliary switch is turned on, a closed circuit which includes the first diode, the first auxiliary inductor, the second auxiliary inductor, the second diode, and the auxiliary switch may be formed.

The first switching portion may include a first switch connected between a cathode of the high voltage battery and one end of a primary side of the transformer and a fourth switch connected between an anode of the high voltage battery and the other end of the primary side of the transformer, and the second switching portion may include a second switch connected between the anode of the high voltage battery and the one end of the primary side of the transformer and a third switch connected between the cathode of the high voltage battery and the other end of the primary side of the transformer.

The zero voltage switching auxiliary circuit may operate at a time when the fourth switch changes from an on state to an off state and the third switch changes from an off state to an on state and a time when the third switch changes from an on state to an off state and the fourth switch changes from an off state to an on state.

BRIEF DESCRIPTION OF THE DRAWINGS

The above and other features and advantages of the present invention will become more apparent to those of ordinary skill in the art by describing in detail embodiments thereof with reference to the accompanying drawings, in which.

DETAILED DESCRIPTION OF EMBODIMENTS

Figure 1:
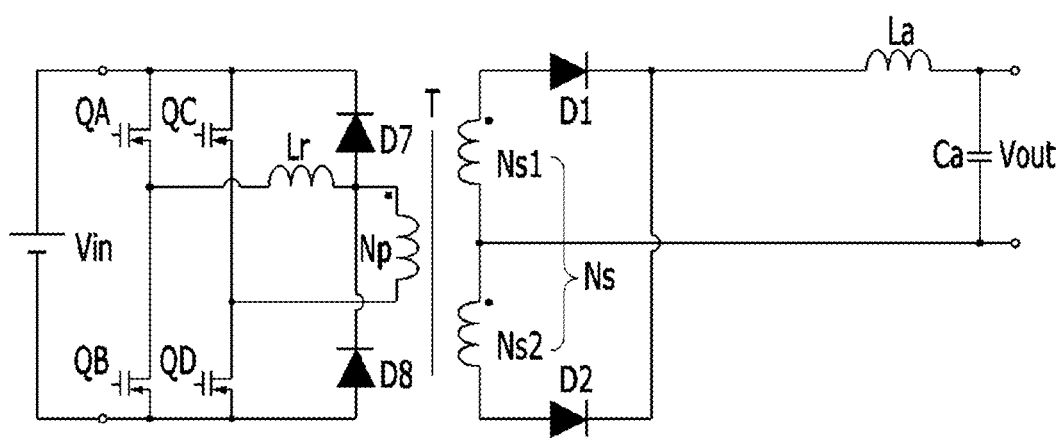
FIG. 1 is a circuit diagram illustrating an example of a phase shift control type low voltage direct current (DC)-DC converter.

Advantages and features of the present invention and a method of achieving the same will become obvious referring to the attached drawings and following embodiments described in detail. However, the present invention is not limited to the embodiments described below and may be embodied in various different modifications. Merely, the embodiments are provided to allow one of ordinary skill in the art to completely understand the scope of the present invention and will be defined by the scope of the claims. Throughout the specification, like reference numerals refer to like elements.

In the description of the embodiments of the present invention, certain detailed explanations of well-known functions or components of the related art will be omitted when it is deemed that they may unnecessarily obscure the essence of the present invention. Also, the terms described below are defined considering functions thereof in the embodiments and may vary with intentions of a user and an operator or practice. Accordingly, the definitions thereof will be given based on the contents throughout the specification.

Hereinafter, components and functions of a low voltage direct current (DC)-DC converter according to embodiments of the present invention will be described in detail with reference to the attached drawings.

Low voltage DC-DC converters are classified into various types according to implementation manners thereof. Here, there is a full-bridge type low voltage DC-DC converter which is adequate for high-power conversion using an insulation type switching method.

FIG. 1 illustrates an example of a typical phase shift control type low voltage DC-DC converter.

As shown in FIG. 1, the low voltage DC-DC converter includes a zero voltage switching resonance coil Lr at a primary coil Np in series and a full-bridge type switching circuit driven through phase shift control. Here, first and second regenerative diodes D7 and D8 are installed between a node of the primary coil Np and the resonance coil Lr and one end and the other end of an input power supply Vin, respectively.

As described above, in case of a configuration of the low voltage DC-DC converter, it is allowed to use a rectifying diode with a small internal voltage and a small forward voltage drop, capable of reducing surge voltages applied to rectifying diodes D1 and D2 by regenerating surge voltages caused by reverse recovery currents of the rectifying diodes D1 and D2 on a secondary side to the input power supply through the regenerative diodes D7 and D8.

However, since it is necessary to include the regenerative diodes D7 and D8 and the resonance coil Lr for reducing surge voltages, the price of the low voltage DC-DC converter increases. Also, since specifications higher than surge voltages are necessary, it is necessary to use high-quality regenerative diodes D7 and D8 and resonance coil Lr.

Figure 2:
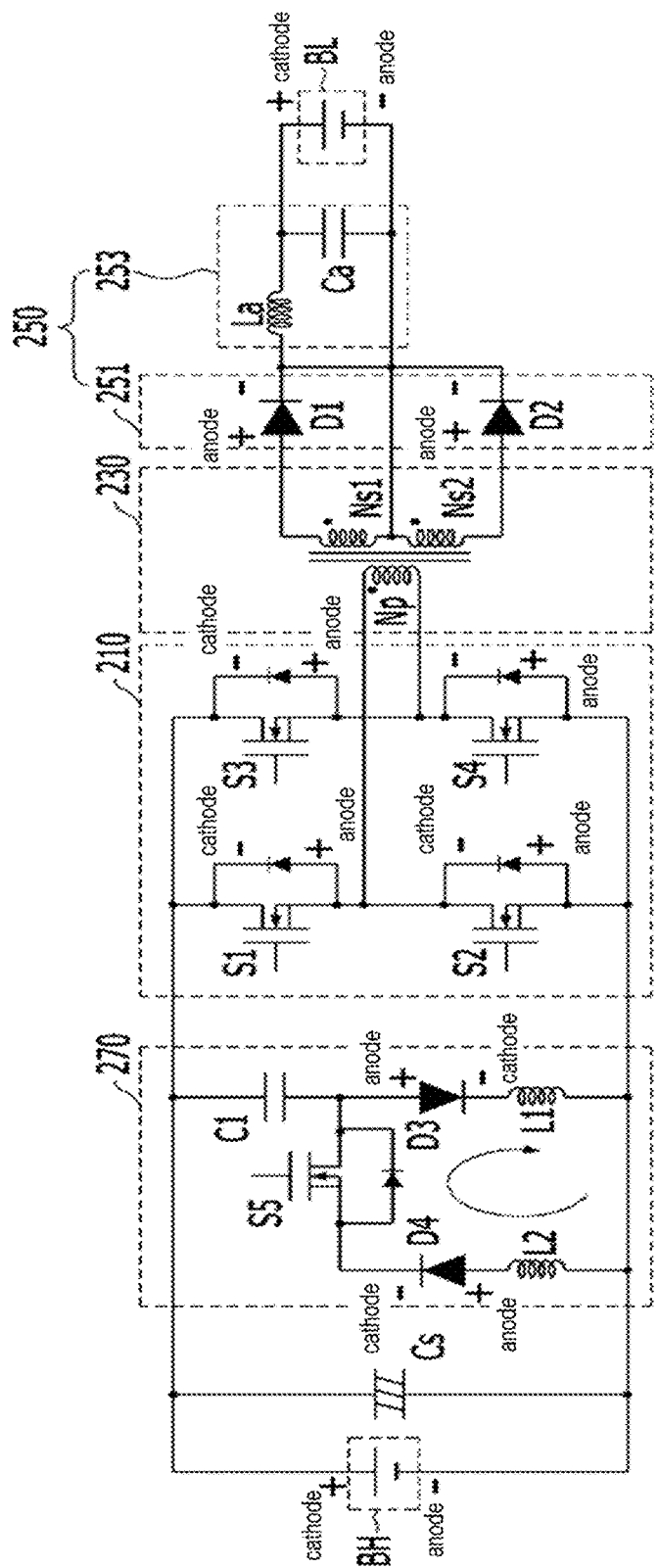
FIG. 2 is a circuit diagram illustrating an example of a low voltage DC-DC converter according to embodiments of the present invention.
Figure 3:
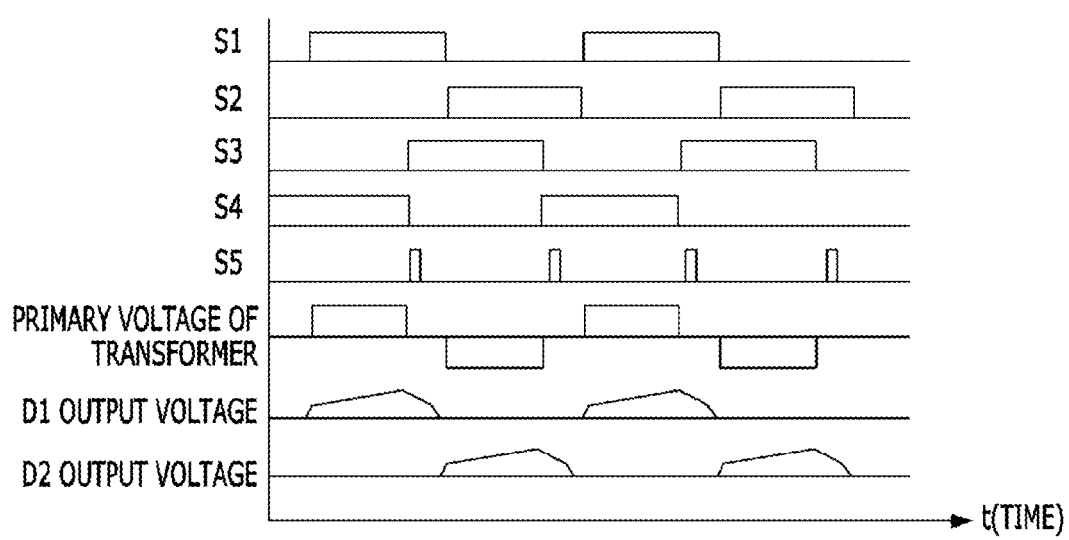
FIG. 3 is a view illustrating output waveforms of a transformer and a rectifying portion according to an operation of a switch in the low voltage DC-DC converter according to embodiments of the present invention.

FIG. 2 is a circuit diagram illustrating an example of a low voltage DC-DC converter according to embodiments of the present invention, and FIG. 3 is a view illustrating output waveforms of a transformer and a rectifying portion according to an operation of a switch in the low voltage DC-DC converter according to embodiments of the present invention.

Referring to FIGS. 2 and 3, a low voltage DC-DC converter 200 converts a high voltage provided from a high voltage battery $B_H$ into a low voltage for a low voltage battery $B_L$ and supplies the low voltage to the low voltage battery $B_L$.

Here, the low voltage DC-DC converter 200 includes a switching portion 210, a transformer 230, a bridge circuit portion 250, and a zero voltage switching auxiliary circuit portion 270 and may further include a smooth capacitor Cs connected in parallel between the high voltage battery $B_H$ and the zero voltage switching auxiliary circuit portion 270.

The switching portion 210 receives a switching signal transmitted from a phase shift control portion and performs zero voltage switching (ZVS) according to the switching signal.

The switching portion 210 is a full-bridge shape switching portion including four switches S1, S2, S3, and S4 and is divided into a first switching portion including a first switch S1 and a fourth switch S4 and a second switching portion including a second switch S2 and a third switch S3.

Here, the first switch S1 is connected between a cathode of the high voltage battery BH and one end of a primary side Np of the transformer 230 and the fourth switch S4 is connected between an anode of the high voltage battery BH and the other end of the primary side Np of the transformer 230.

Also, the second switch S2 is connected between the anode of the high voltage battery BH and the one end of the primary side Np of the transformer 230 and the third switch S3 is connected between the cathode of the high voltage battery BH and the other end of the primary side Np of the transformer 230.

Meanwhile, when the first switching portion S1 and S4 is turned on or the second switching portion S2 and S3 is turned on, a certain level of voltage is output from the switching portion 210 to the primary side Np of the transformer 230 and the first switching portion S1 and S4 and the second switching portion S2 and S3 are alternately turned on and off. Here, the first switching portion and the second switching portion complementarily operate.

Here, in the operation of the switching portion 210, the second switching portion S2 and S3 is turned off when the first switching portion S1 and S4 is turned on and the first switching portion S1 and S4 is turned off when the second switching portion S2 and S3 is turned on.

Meanwhile, when the first switching portion S1 and S4 is turned off, the fourth switch S4 is turned off and then the first switch S1 is turned off. When the first switching portion S1 and S4 is turned on, the fourth switch S4 is turned on and then the first switch S1 is turned on.

Also, when the second switching portion S2 and S3 is turned on, the third switch S3 is turned on and then the second switch S2 is turned on. When the second switching portion S2 and S3 is turned off, the third switch S3 is turned off and then the second switch S2 is turned off.

The transformer 230 converts and outputs an output voltage of the switching portion 210 into a certain level of voltage.

Here, the transformer 230 is a transformer with a turn ratio of 1:n and a center tap applied thereto. Since the transformer 230 is well-known, a detailed description thereof will be omitted.

The bridge circuit portion 250 is configured to rectify and supply an output signal of the transformer 230 to the low voltage battery $B_L$.

Here, the bridge circuit portion 250 may include a rectifier 251 and a LC filter 253. The rectifier 251 may include first and second diodes D1 and D2, and the LC filter 253 may include an inductor La and a capacitor Ca.

In the rectifier 251, an anode of the first diode D1 is connected to one end of a secondary coil of the transformer 230, an anode of the second diode D2 is connected to the other end of the secondary coil of the transformer 230, cathode of the first and second diodes D1 and D2 are connected to each other and connected to a cathode of the low voltage battery $B_L$ through the LC filter 253 at the same time.

Also, in the LC filter 253, the inductor La is connected between the cathodes of the first and second diodes D1 and D2 and the low voltage battery $B_L$ and the capacitor Ca is connected to the low voltage battery $B_L$ in parallel to allow one side thereof to be connected between the inductor La and the cathode of the low voltage battery $B_L$ and the other end thereof to be connected to an anode of the low voltage battery $B_L$ and a center of a secondary side of the transformer 230.

The zero voltage switching auxiliary circuit portion 270 is provided between the high voltage battery $B_H$ and the switching portion 210 to prevent a switching loss of the switching portion 210 and operates by receiving the switching signal transmitted from the phase shift control portion.

Here, the zero voltage switching auxiliary circuit portion 270 operates at a time when operations of the first switching portion S1 and S4 and the second switching portion S2 and S3 change and consumes residual energy in the switching portion 210.

That is, when the first switching portion S1 and S4 changes from an on state to an off state and the second switching portion S2 and S3 changes from an off state to an on state, the zero voltage switching auxiliary circuit portion 270 operates and the first switching portion S1 and S4 operates and consumes energy condensed in the switching portion 210, thereby preventing the residual energy condensed in the switching portion 210 from having an effect on the operation of the second switching portion S2 and S3 after the first switching portion S1 and S4 operates.

Similarly, when the second switching portion S2 and S3 changes from the on state to the off state and the first switching portion S1 and S4 changes from the off state to the on state, the zero voltage switching auxiliary circuit portion 270 operates and the second switching portion S2 and S3 operates and consumes energy condensed in the switching portion 210, thereby preventing the residual energy condensed in the switching portion 210 from having an effect on the operation of the first switching portion S1 and S4 after the second switching portion S2 and S3 operates.

In a structure of the zero voltage switching auxiliary circuit portion 270, an auxiliary capacitor C1, a third diode D3, and a first auxiliary inductor L1 which are connected in series are connected between the high voltage battery $B_H$ and the switching portion 210 in parallel. Hereinafter, a circuit in which the auxiliary capacitor C1, the third diode D3, and the first auxiliary inductor L1 are connected in series will be referred to as a first circuit portion.

Here, an anode of the third diode D3 is connected to a cathode of the high voltage battery $B_H$ through the auxiliary capacitor C1 and a cathode of the third diode D3 is connected to an anode of the high voltage battery $B_H$ through the first auxiliary inductor L1.

Also, there is positioned an auxiliary switch S5 which has one end connected between the auxiliary capacitor C1 and the third diode D3 and operates by receiving the switching signal transmitted from the phase shift control portion.

Also, a second auxiliary inductor L2 and a fourth diode D4 are connected in series between the other end of the auxiliary switch S5 and the anode of the high voltage battery $B_H$. Hereinafter, a circuit in which the second auxiliary inductor L2 and the fourth diode D4 are connected in series will be referred to as a second circuit portion.

Here, a cathode of the fourth diode D4 is connected to the other end of the auxiliary switch S5 and an anode of the fourth diode D4 is connected to the anode of the high voltage battery $B_H$ through the second auxiliary inductor L2.

Accordingly, when the auxiliary switch S5 is turned on, a closed circuit is formed along a route of 'D3-L1-L2-D4-S5'.

Here, as shown in FIG. 3, a time when the auxiliary switch S5 is turned on includes a time when the first switching portion S1 and S4 changes from the on state to the off state and the second switching portion S2 and S3 changes from the off state to the on state and a time when the second switching portion S2 and S3 changes from the on state to the off state and the first switching portion S1 and S4 changes from the off state to the on state.

In detail, the auxiliary switch S5 is turned on when the fourth switch S4 of the first switching portion changes from an on state to an off state and the third switch S3 of the second switching portion changes from an off state to an on state and when the third switch S3 of the second switching portion changes from the on state to the off state and the fourth switch S4 of the first switching portion changes from the off state to the on state.

As described above, the auxiliary switch S5 is turned on when the first switching portion S1 and S4 and the second switching portion S2 and S3 change from the on state to the off state or from the off state to the on state.

Accordingly, since energy condensed in the switching portion 210 while the first switching portion S1 and S4 operates is consumed according to an operation of the zero voltage switching auxiliary circuit portion 270 before the second switching portion S2 and S3 is turned on, the second switching portion S2 and S3 is not influenced by the residual energy condensed in the switching portion 210 while the first switching portion S1 and S4 operates, when the second switching portion S2 and S3 operates.

Similarly, since energy condensed in the switching portion 210 while the second switching portion S2 and S3 operates is consumed according to the operation of the zero voltage switching auxiliary circuit portion 270 before the first switching portion S1 and S4 is turned on, the first switching portion S1 and S4 is not influenced by the residual energy condensed in the switching portion 210 while the second switching portion S2 and S3 operates, when the first switching portion S1 and S4 operates.

Formerly, since it is necessary for a typical low voltage DC-DC converter to include regenerative diodes and a resonance coil to reduce surge voltages, the price thereof increases. Also, since specifications higher than surge voltages are necessary, high quality regenerative diodes and resonance coil are necessary.

However, as in the above, it is possible to perform stable zero voltage switching with no need of high-quality regenerative diodes and resonance coil by installing a zero voltage switching auxiliary circuit portion between a high voltage battery and a switching portion.

Meanwhile, while the low voltage DC-DC converter according to embodiments of the present invention has been described, the scope of the present invention is not limited thereto and various substitutes, modifications, and changes therein may be executed by one of ordinary skill in the art within an obvious range.

Accordingly, the embodiments described herein and the attached drawings will not intend to limit but explain the technical concept of the present invention and the scope of the technical concept of the present invention is not limited to the embodiments and the attached drawings. It will be understood that the scope of the present invention should be defined by the claims and equivalents thereof should be included in the scope of the present invention.

What is claimed is:

1. A direct current-direct current (DC-DC) converter for converting a high voltage provided from a high voltage battery into a low voltage and supplying the low voltage to a low voltage battery, comprising:
    a switching portion which comprises a first switching portion and a second switching portion and is configured to covert a high voltage direct current (DC) input from the high voltage battery to an alternating current (AC) voltage output;

a transformer configured to convert the AC voltage output from the switching portion into a low voltage DC output; and a zero voltage switching auxiliary circuit portion connected between the high voltage battery and the switching portion and configured to operate when operations of the first and second switching portions change to consume residual energy in the switching portion, wherein the zero voltage switching auxiliary circuit portion comprises:

a first circuit portion which comprises an auxiliary capacitor, a first diode, and a first auxiliary inductor mutually connected in series and connected to the high voltage battery in parallel;

an auxiliary switch which has one end connected between the auxiliary capacitor and an anode of the first diode and configured to operate by receiving a switching signal transmitted from a phase shift control portion; and a second circuit portion which comprises a second auxiliary inductor and a second diode mutually connected in series and connected between the other end of the auxiliary switch and an anode of the high voltage battery.

2. The DC-DC converter of claim 1, wherein the zero voltage switching auxiliary circuit portion is configure to operate the first switching portion changes from an on state to an off state and the second switching portion changes from an off state to an on state.

3. The DC-DC converter of claim 1, wherein the zero voltage switching auxiliary circuit portion is configure to operate when the second switching portion changes from an on state to an off state and the first switching portion changes from an off state to an on state.

4. The DC-DC converter of claim 1, wherein the anode of the first diode is connected to a cathode of the high voltage battery via the auxiliary capacitor, and an anode of the second diode is connected to the anode of the high voltage battery via the second auxiliary inductor.

5. The DC-DC converter of claim 1, wherein an cathode of the second diode is connected to the other end of the auxiliary switch, and an anode of the second diode is connected to the anode of the high voltage battery via the second auxiliary inductor.

6. The DC-DC converter of claim 1, wherein when the auxiliary switch is turned on, a closed circuit which comprises the first diode, the first auxiliary inductor, the second auxiliary inductor, the second diode, and the auxiliary switch is formed.

7. The DC-DC converter of claim 1, wherein the first switching portion comprises a first switch connected between a cathode of the high voltage battery and one end of a primary side of the transformer and a fourth switch connected between the anode of the high voltage battery and the other end of the primary side of the transformer, and wherein the second switching portion comprises a second switch connected between the anode of the high voltage battery and the one end of the primary side of the transformer and a third switch connected between the cathode of the high voltage battery and the other end of the primary side of the transformer.

8. The DC-DC converter of claim 7, wherein the zero voltage switching auxiliary circuit is configured to operate the fourth switch changes from an on state to an off state and the third switch changes from an off state to an on state and when the third switch changes from an on state to an off state and the fourth switch changes from an off state to an on state.

* * * * *